(12) United States Patent
Hatano et al.

(10) Patent No.: US 10,301,180 B2
(45) Date of Patent: May 28, 2019

(54) ACTIVATED CARBON REGENERATION METHOD AND GOLD RECOVERY METHOD

(71) Applicant: JX NIPPON MINING & METALS CORPORATION, Tokyo (JP)

(72) Inventors: Kazuhiro Hatano, Tsuruga (JP); Akira Yoshimura, Hitachi (JP); Ryosuke Tatsumi, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 0 days.

(21) Appl. No.: 15/541,145

(22) PCT Filed: Mar. 3, 2016

(86) PCT No.: PCT/JP2016/057483
§ 371 (c)(1),
(2) Date: Jun. 30, 2017

(87) PCT Pub. No.: WO2016/143837
PCT Pub. Date: Sep. 15, 2016

(65) Prior Publication Data
US 2017/0369324 A1 Dec. 28, 2017

(30) Foreign Application Priority Data

Mar. 6, 2015 (JP) ................. 2015-045097
Mar. 6, 2015 (JP) ................. 2015-045107

(51) Int. Cl.
| | | |
|---|---|---|
| C01B 32/00 | (2017.01) | |
| C01B 32/36 | (2017.01) | |
| C01G 7/00 | (2006.01) | |
| C22B 3/24 | (2006.01) | |
| C22B 3/00 | (2006.01) | |
| B01J 20/20 | (2006.01) | |
| B01J 20/34 | (2006.01) | |

(52) U.S. Cl.
CPC .............. *C01B 32/36* (2017.08); *B01J 20/20* (2013.01); *B01J 20/3416* (2013.01); *B01J 20/3475* (2013.01); *C01G 7/003* (2013.01); *C22B 3/24* (2013.01); *C22B 11/04* (2013.01); *Y02P 10/234* (2015.11)

(58) Field of Classification Search
CPC ....... C01B 32/354; C01B 32/36; C22B 11/04; C22B 11/06; C22B 3/24; C01G 7/003
USPC ........................... 205/568, 571; 502/416–423
See application file for complete search history.

(56) References Cited

U.S. PATENT DOCUMENTS

| | | | | |
|---|---|---|---|---|
| 2,579,531 A | * | 12/1951 | Zadra .................... | C01G 5/003 205/566 |
| 2,588,450 A | * | 3/1952 | Zadra ..................... | C25C 1/20 204/293 |
| 2,835,569 A | * | 5/1958 | Reynaud ................. | C22B 11/06 205/568 |
| 3,935,006 A | * | 1/1976 | Fischer .................. | C01G 5/003 210/674 |
| 3,970,737 A | * | 7/1976 | Davidson ............... | B01D 15/00 423/150.1 |
| 4,188,208 A | | 2/1980 | Guay | |
| 4,208,378 A | * | 6/1980 | Heinen .................... | C01G 7/00 423/25 |
| 4,267,069 A | * | 5/1981 | Davidson ............... | C01G 7/003 210/694 |
| 4,578,163 A | | 3/1986 | Kunter et al. | |
| 4,968,346 A | * | 11/1990 | Belsak .................... | C22B 11/04 210/673 |
| 5,019,162 A | * | 5/1991 | Suzuki ................... | C01G 7/003 423/25 |
| 5,176,886 A | * | 1/1993 | Darnall ................... | C22B 11/08 423/24 |
| 5,449,396 A | * | 9/1995 | Laskorin ................. | C22B 11/08 423/24 |
| 6,238,632 B1 | * | 5/2001 | Kamps ................. | B01J 20/3416 252/184 |
| 2001/0008617 A1 | | 7/2001 | Robles | |
| 2007/0014709 A1 | | 1/2007 | Moyes et al. | |

(Continued)

FOREIGN PATENT DOCUMENTS

| | | |
|---|---|---|
| CA | 2 861 419 A1 | 7/2013 |
| CA | 2 884 363 A1 | 3/2014 |
| CN | 203437136 * | 2/2014 |

(Continued)

OTHER PUBLICATIONS

Translation of CN 203437136, Feb. 2014. (Year: 2014).*
International Preliminary Report on Patentability, issued in PCT/JP2016/057483, dated May 17, 2017.
International Search Report, issued in PCT/JP2016/057483, dated May 25, 2016.
Written Opinion of the International Searching Authority, issued in PCT/JP2016/057483, dated May 25, 2016.

* cited by examiner

*Primary Examiner* — Steven J Bos
(74) *Attorney, Agent, or Firm* — Birch, Stewart, Kolasch & Birch, LLP

(57) ABSTRACT

An activated carbon regeneration method of the present invention is for eluting gold from activated carbon on which the gold has been adsorbed and thereafter recycling, in adsorption of the gold, the used activated carbon from which the gold has been eluted, the method including: washing the used activated carbon with an acidic washing liquid, alkaline washing liquid or neutral washing liquid; and when the used activated carbon is washed with the acidic washing liquid, keeping the acidic washing liquid after the washing in an acidic region, or when the used activated carbon is washed with the alkaline washing liquid or neutral washing liquid, keeping the alkaline washing liquid or neutral washing liquid after the washing in an alkaline region or neutral region.

7 Claims, 2 Drawing Sheets

(56) References Cited

U.S. PATENT DOCUMENTS

| | | |
|---|---|---|
| 2009/0241735 A1 | 10/2009 | Abe et al. |
| 2014/0144788 A1* | 5/2014 | Barton ............... C22B 3/02 |
| | | 205/704 |

FOREIGN PATENT DOCUMENTS

| | | |
|---|---|---|
| EP | 0 010 381 A1 | 4/1980 |
| JP | 61-186430 A | 8/1966 |
| JP | 2006-512484 A | 4/2006 |
| JP | 2009-235525 A | 10/2009 |
| JP | 2013-147685 A | 8/2013 |
| JP | 2014-55311 A | 3/2014 |
| WO | WO 02/22899 A2 | 3/2002 |
| WO | WO 2011/160179 A1 | 12/2011 |

[Fig. 1]
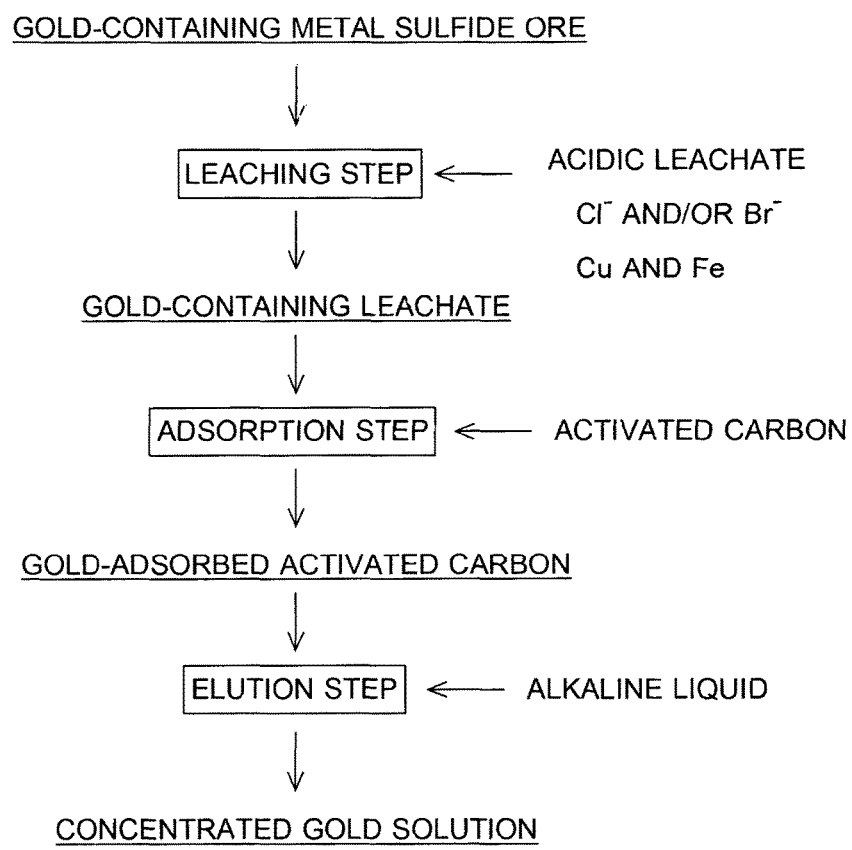

[Fig. 2]
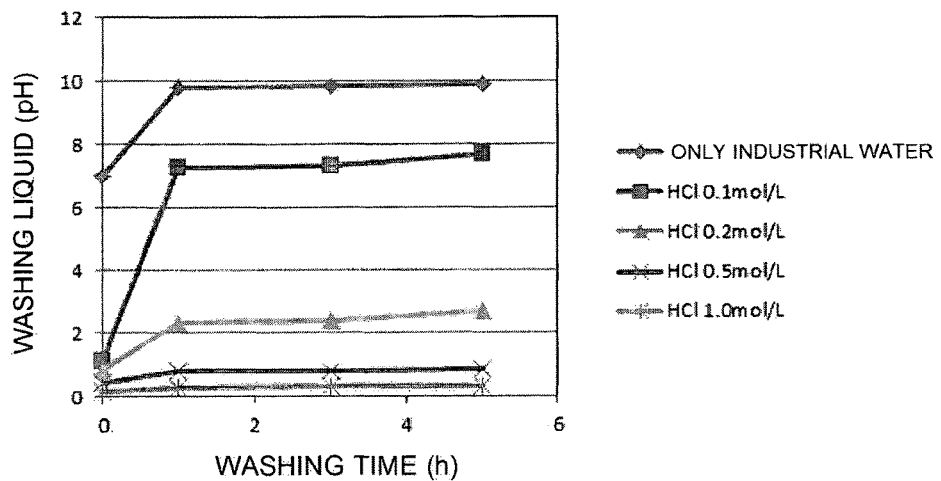
[Fig. 3]
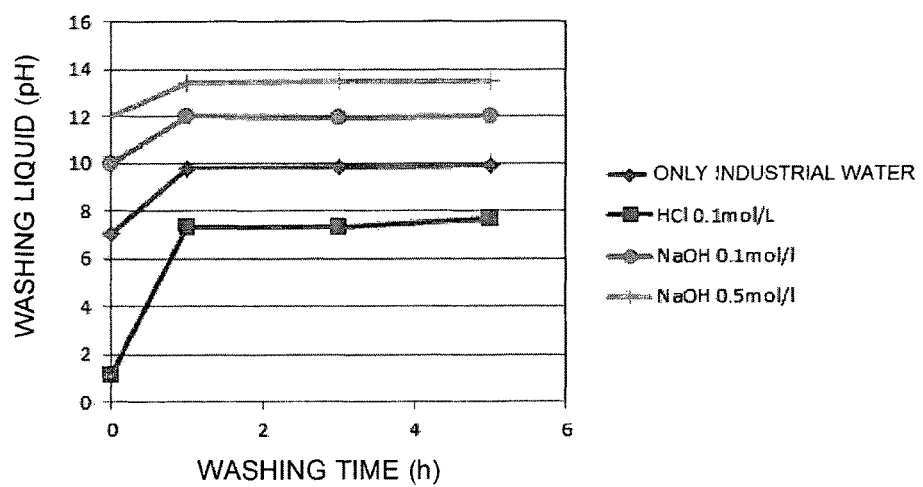

ACTIVATED CARBON REGENERATION METHOD AND GOLD RECOVERY METHOD

TECHNICAL FIELD

The present invention relates to an activated carbon regeneration method of regenerating activated carbon after having been used to temporarily adsorb gold for recovery thereof, for use in adsorption of gold once again, and a gold recovery method. Particularly, the invention proposes a technique of ensuring regeneration of used activated carbon with high activity.

BACKGROUND ART

Examples of methods for recovering gold contained in gold-containing metal sulfide ores include those described in Patent Literatures 1 and 2.

The methods described in these Patent Literatures 1 and 2 include: firstly, using an acidic leachate containing chloride ions and/or bromide ions as an anion and copper and iron as a cation to leach gold from a gold-containing metal sulfide ore into the acidic leachate while warming, then adsorbing the gold in the acidic leachate on activated carbon; and, thereafter, eluting the gold adsorbed on the activated carbon with an alkali liquid. Such gold recovery methods enable inexpensive and efficient recovery of gold contained in metal sulfide ores.

Activated carbon after having been used as an adsorbent which temporarily adsorbs gold in an acidic leachate in such a gold recovery method has a lowered activity, and thus must be regenerated for repeated use in adsorption of gold once again.

Regeneration treatment of used activated carbon typically includes heating used activated carbon at a temperature of about 250° C. in a non-oxidizing atmosphere for reactivation thereof, what is called, activation treatment, thereby recovering the adsorption performance of the used activated carbon as described in Patent Literatures 3.

CITATION LIST

Patent Literatures

[PTL 1] JP 2013-147685 A
[PTL 2] JP 2014-55311 A
[PTL 3] U.S. Pat. No. 4,188,208

SUMMARY OF INVENTION

Technical Problem

However, it has been found that the activation treatment involving heating at a high temperature in a non-oxidizing atmosphere, as described above, can increase the activity of activated carbon to be regenerated up to only about 60% of that of activated carbon not in use, leading to insufficient recovery of its adsorption performance.

Therefore, when the activated carbon regenerated by such activation treatment is used in adsorption of gold in the gold recovery methods as described above, insufficient adsorption of the gold leached into the acidic leachate on the activated carbon resulted in failure to improve the gold recovery rate as expected.

The present invention aims at solving such problems, and an object of the invention is to provide an activated carbon regeneration method which can regenerate used activated carbon so as to have higher activity than that obtained by the previously-mentioned activation treatment to ensure effective repeated use of the activated carbon, and a gold recovery method.

Solution to Problem

As a result of earnest studies, the inventor has found that the activity of activated carbon after use can be greatly increased by washing the used activated carbon with an acidic washing liquid and, further, adjusting the conditions for washing the used activated carbon so that the acidic washing liquid after washing of the used activated carbon which has sometimes been in an alkaline region depending on the use mode is maintained in an acidic region.

This is considered to be due to the fact that, by using activated carbon in adsorption of gold as described above, copper, iron and other metals attached to the surface of the used activated carbon are dissolved in the acidic washing liquid during washing, and then that the acidic region of the acidic washing liquid is maintained until after washing, thereby preventing re-deposition of the metals and keeping the state where the surface of the activated carbon is exposed. However, the present invention is not intended to be limited by such theory.

The present inventor has found that the activity of activated carbon after use can be greatly increased also by washing the used activated carbon with an alkaline or neutral washing liquid and, further, adjusting the conditions for washing the used activated carbon so that the alkaline or neutral washing liquid after washing is maintained in an alkaline or neutral region.

This is considered to be due to the fact that, by using activated carbon in adsorption of gold as described above, for example, sodium of sodium ions or sodium compounds attached to the surface of the used activated carbon is removed by washing with the alkali or neutral washing liquid so that the surface of the activated carbon is exposed. However, the present invention is not intended to be limited by such theory.

According to the knowledge, an activated carbon regeneration method of the present invention is for recycling used activated carbon in adsorption of gold, from which gold has been eluted, after eluting the gold from activated carbon on which the gold has been adsorbed, the method including: washing the used activated carbon with an acidic washing liquid, alkaline washing liquid or neutral washing liquid; and when the used activated carbon is washed with the acidic washing liquid, keeping the acidic washing liquid after the washing in an acidic region, or when the used activated carbon is washed with the alkaline washing liquid or neutral washing liquid, keeping the alkaline washing liquid or neutral washing liquid after the washing in an alkaline region or neutral region.

When the used activated carbon is washed with the acidic washing liquid, the pH of the acidic washing liquid after the washing is preferably defined as 2.7 or lower.

Also, when the used activated carbon is washed with the acidic washing liquid, a hydrochloric acid solution is used as the acidic washing liquid preferably.

Alternatively, when the used activated carbon is washed with the alkaline washing liquid, the pH of the alkaline washing liquid after the washing is preferably defined as 8 to 12.

Also, when the used activated carbon is washed with the alkaline washing liquid, an aqueous caustic soda solution is used as the alkaline washing liquid, and the molar concentration of the aqueous caustic soda solution is defined as 0.1 mol/L to 2.0 mol/L, preferably.

Alternatively, when the used activated carbon is washed with the neutral washing liquid, water is used as the neutral washing liquid, preferably.

In the activated carbon regeneration method of the present invention, when the used activated carbon is washed with the acidic washing liquid, alkaline washing liquid or neutral washing liquid, a column is filled with the used activated carbon, and the acidic washing liquid, alkaline washing liquid or neutral washing liquid is allowed to flow into the column, preferably.

Also, the activated carbon regeneration method of the present invention is preferably intended for the used activated carbon after elution of the gold from the activated carbon by using a cyanide solution, on which the gold has been adsorbed.

Also, the activated carbon regeneration method of the present invention is preferably intended for the used activated carbon after elution of the gold from the activated carbon on which the gold has been adsorbed, the activated carbon having been used for adsorption of the gold in a gold-containing liquid, and in this case, the gold-containing liquid is preferably a liquid obtained by leaching the gold contained in a gold-containing metal sulfide ore, while warming, into an acidic leachate containing chloride ions and/or bromide ions as an anion and copper and iron as a cation.

A gold recovery method of the present invention includes: a gold leaching step of leaching the gold contained in a gold-containing metal sulfide ore, while warming, into an acidic leachate containing chloride ions and/or bromide ions as an anion and copper and iron as a cation; a gold adsorption step of adsorbing the gold leached into the acidic leachate on activated carbon; and a gold elution step of eluting the gold adsorbed on the activated carbon, wherein the activated carbon regenerated by any one of the activated carbon regeneration method described above is used as the activated carbon.

Advantageous Effects of Invention

According to the activated carbon regeneration method of this invention, the activity of activated carbon after use can be greatly increased by washing the used activated carbon with an acidic leachate, an alkaline washing liquid or neutral washing liquid, and, when the used activated carbon is washed with an acidic washing liquid, keeping the acidic washing liquid after the washing in an acidic region, or when the used activated carbon is washed with an alkaline washing liquid or neutral washing liquid, keeping the alkaline washing liquid or neutral washing liquid after the washing in an alkaline region or neutral region.

Also, the gold recovery method of this invention enables effective use of activated carbon of which the adsorption performance has been fully recovered by the regeneration method.

BRIEF DESCRIPTION OF DRAWINGS

FIG. 1 is a flowchart showing one embodiment of a gold recovery method of this invention.

FIG. 2 is a graph showing the transition of the pH of washing liquids with elapse of time in Test Example 2 of Examples.

FIG. 3 is a graph showing the transition of the pH of washing liquids with elapse of time in Test Example 5 of Examples.

DESCRIPTION OF EMBODIMENTS

Hereinafter, the embodiments of this invention will be described in detail.

An activated carbon regeneration method of the present invention is for recycling used activated carbon in adsorption of gold, from which gold has been eluted, after eluting the gold from activated carbon on which the gold has been adsorbed, the method including: washing the used activated carbon with an acidic washing liquid, alkaline washing liquid or neutral washing liquid; and when the used activated carbon is washed with the acidic washing liquid, keeping the acidic washing liquid after the washing in an acidic region, or when the used activated carbon is washed with the alkaline washing liquid or neutral washing liquid, keeping the alkaline washing liquid or neutral washing liquid after the washing in an alkaline region or neutral region.

(Used Activated Carbon)

Activated carbon typically used as an adsorbent which adsorbs gold, for example, common activated carbon produced, for example, by physical methods such as activation treatment which converts wood materials, coconut husks, and other carbonaceous raw materials into porous raw materials or chemical methods using chemicals can be used as the activated carbon.

Especially, the regeneration method of this invention is intended for the activated carbon after having been used to temporarily adsorb gold and then elute the adsorbed gold in a gold recovery method, which is referred to as "used activated carbon" herein.

(Washing Liquid)

The used activated carbon used in recovery of gold has sometimes been in an alkaline region due to the elution of the adsorbed gold using cyanide solution or the like in the recovery of gold. Such used activated carbon is dried according to need, and then washed with an acidic washing liquid, alkaline washing liquid, or neutral washing liquid in this invention.

<Acidic Washing Liquid>

When an acidic washing liquid is used, the used activated carbon is washed with the acidic washing liquid, and, thereafter, the kind and concentration of the acidic washing liquid, washing time and other conditions are adjusted, in accordance with the state of the used activated carbon, so that the acidic washing liquid is in an acidic region, i.e., the pH of the acidic washing liquid is lower than 7, at the time of completion of the washing.

For example, when used activated carbon which is in an alkaline region is washed with the acidic washing liquid, the pH of the acidic washing liquid increases. However, even in this case, the various conditions are controlled so that the acidic region is maintained without increasing the pH of the acidic washing liquid at the time of completion of washing to 7 or higher.

It is considered that metals such as copper and iron attached to and remaining on the surface of the activated carbon when the activated carbon is used in the gold recovery method are dissolved in the acidic washing liquid during this washing, and then that the surface, which contributes to adsorption of gold, of the used activated carbon is exposed.

The acidity of the acidic washing liquid is maintained until completion of washing, thereby preventing re-deposition of the metals such as copper and iron dissolved in the acidic washing liquid.

As a result, it is made possible to greatly increase the activity of the used activated carbon and effectively recover its adsorption performance, in comparison with activation treatment in a non-oxidizing atmosphere and at a high temperature as described previously.

For example, when, due to the alkalinity of the used activated carbon as its original nature, the acidic washing liquid becomes neutral at the time of completion of washing of the used activated carbon, the metals such as copper and iron attached to the surface of the used activated carbon are once dissolved and then re-deposited to cover the activated carbon surface again, so that the activity of the used activated carbon cannot be effectively increased.

For more efficient dissolution of copper, iron and the like attached to the surface of the used activated carbon to further increase the activity of the activated carbon after regeneration treatment, the pH of the acidic washing liquid at the time of completion of washing is defined preferably as 2.7 or lower, and more preferably as 1.0 or lower.

Also, various solutions of hydrochloric acid, sulfuric acid and other mineral acids can be used as the acidic washing liquid described above, and, among others, a hydrochloric acid solution is preferably used when the activated carbon after regeneration is used in a gold recovery method as will be described later.

In this case, the concentration of the hydrochloric acid solution as the acidic washing liquid is preferably higher in order to maintain the pH of the acidic washing liquid after completion of washing at a low level. Therefore, the concentration of this hydrochloric acid solution can be defined as 0.2 mol/L or higher, and is especially preferably defined as 0.5 mol/L or higher.

<Alkaline Washing Liquid or Neutral Washing Liquid>

When an alkaline washing liquid or neutral washing liquid is used, the used activated carbon is washed with the alkaline or neutral washing liquid, and, thereafter, the kind and concentration of the alkaline or neutral washing liquid, washing time and other conditions are adjusted, in accordance with the state of the used activated carbon, so that the alkaline or neutral washing liquid is in an alkaline or neutral region, i.e., the pH of the alkaline or neutral washing liquid is 7 or higher, at the time of completion of the washing.

In short, the various conditions are controlled so that the alkaline or neutral washing liquid after washing of the used activated carbon does not become in an acidic region by washing.

It is considered that sodium of sodium ions or sodium compounds attached to and remaining on the surface of the activated carbon when the activated carbon is used in a gold recovery method is removed by washing with this alkali or neutral washing liquid, resulting in the exposure of the surface, which contributes to adsorption of gold, of the used activated carbon.

As a result, it is made possible to greatly increase the activity of the used activated carbon and effectively recover its adsorption performance, in comparison with activation treatment in a non-oxidizing atmosphere and at a high temperature as described previously.

As described above, when the used activated carbon is washed with the acidic washing liquid, and, due to the alkalinity of the used activated carbon as its original nature, the acidic washing liquid becomes neutral or alkaline at the time of completion of washing of the used activated carbon, the metals such as copper and iron attached to the surface of the used activated carbon are once dissolved and then re-deposited to cover the pores formed in the activated carbon, so that the activity of the used activated carbon cannot be effectively increased.

Contrary to this, in this embodiment, the used activated carbon is washed with the alkaline or neutral washing liquid to keep the alkaline or neutral washing liquid after washing in an alkaline or neutral region, so that the metals such as copper and iron attached to the surface of the used activated carbon are not actually dissolved, and are maintained in a state where they remained attached thereto before washing, thereby making it possible to effectively improve the activity as much as removal of sodium on the activated carbon surface.

In order to more effectively exclude, for example, sodium attached to the surface of the used activated carbon and to further increase the activity of the activated carbon after regeneration treatment, the pH of the washing liquid at the time of completion of washing is defined preferably as 7 to 12, and more preferably as 8 to 12. In other words, in the case where the pH of the washing liquid after washing is too low, when a weak acid is added to lower the pH of the washing liquid after washing which has been in the alkaline region, copper, iron and the like attached to the used activated carbon are once dissolved and then deposited, and cover the activated carbon surface again, so that the activity may not be greatly increased. Whereas, in the case where the pH is too high, sodium attached to the activated carbon, for example, cannot be fully removed at the time of washing with an alkaline washing liquid, and sodium hydroxide contained in the washing liquid sometimes remain in the activated carbon. When this activated carbon is recycled in adsorption of gold, the remaining caustic substance, or Cu and Fe contained in an Au solution is/are likely to be deposited in an alkali to inhibit Au adsorption.

Aqueous caustic soda solutions and other various alkaline solutions can be used as the alkaline washing liquid described above. Examples of the neutral washing liquid can include water. Among others, when the activated carbon after regeneration is used in the gold recovery method which will be described later, an aqueous caustic soda solution or water is preferably used.

The molar concentration of the alkaline or neutral washing liquid can be defined preferably as 0 mol/L to 2.0 mol/L, and more preferably as 0 mol/L to 1.0 mol/L.

Especially, when an aqueous caustic soda solution is selected as the alkaline or neutral washing liquid, the molar concentration of the aqueous caustic soda solution is suitably defined as 0.1 mol/L to 2.0 mol/L. Too high a molar concentration of the aqueous caustic soda solution may cause deposition of sodium contained in caustic soda on the surface of the activated carbon during washing, and this sodium is likely to inhibit the improvement in activity.

When water is selected as the alkaline or neutral washing liquid, tap water, industrial water, distilled water, purified water; ion exchange water, pure water, ultrapure water and the like can be specifically used.

When any of the acidic washing liquids, alkaline washing liquids or neutral washing liquids as described above is used, the pulp concentration of the used activated carbon in the acidic, alkaline or neutral washing liquid during washing of the activated carbon is preferably low, and, specifically, is suitably defined as 100 g/L to 400 g/L from the viewpoint of efficiently increasing the activity of the activated carbon after washing. When the pulp concentration exceeds 400 g/L, the activity may not be so greatly improved in some cases. The pulp concentration as used herein refers to a value obtained by dividing the dry weight (g) of the used activated carbon by the volume (L) of the acidic, alkaline or neutral washing liquid used in washing.

Washing with such an acidic, alkaline or neutral washing liquid can be carried out, for example, by immersing used activated carbon in an acidic, alkaline or neutral washing liquid and washing the activated carbon with or without stirring, as well as by filling, for example, a cylindrical column with used activated carbon and passing an acidic, alkaline or neutral washing liquid into the column. In the latter case, the pH of the acidic, alkaline or neutral washing liquid at the time of completion of washing can be regulated by measuring the pH of the acidic, alkaline or neutral washing liquid passed through the column as the acidic, alkaline or neutral washing liquid after washing, and making adjustment including changing the concentration and liquid passage rate of the acidic, alkaline or neutral washing liquid to be passed through the column based on the measurement value.

Prior to such washing with the acidic, alkaline or neutral washing liquid, the used activated carbon can also be activated. In this activation treatment, the used activated carbon is heated at 200° C. to 300° C., for example, in a steam atmosphere to be reactivated.

(Regenerated Activated Carbon)

The activity of the thus-regenerated activated carbon can be calculated from the following Fleming's equation (1), for example, using a measurement value obtained through a test on adsorption of gold on the activated carbon introduced into a gold-containing solution:

$$q = k \times c \times t^n \qquad \text{Equation (1)}$$

wherein k represents the carbon activity; q represents the amount (g/t) of gold adsorbed on the activated carbon; c represents the concentration (g/L) of gold in the solution; t represents the adsorption time (hr); and n represents a constant.

This equation (1) can be used to calculate the activity k. More specifically, an approximate equation in the same form as that of Fleming's equation (1) can be obtained, for example, by periodically collecting liquid samples over a plurality of times within a predetermined test time (2 hours) and plotting the measurement values of those liquid samples in a graph which represents the relation between q/c and t for cumulative approximation. From this approximate equation, k and n can be obtained.

The activity of the activated carbon regenerated by the regeneration method of this invention, which is calculated from the above equation (1), can be increased, for example, to 80% or more relative to similar activity of unused activated carbon.

On the other hand, similar activity of the activated carbon regenerated only by activation treatment at a high temperature in a non-oxidizing atmosphere is typically about 60% or less relative to similar activity of unused activated carbon. Therefore, according to the regeneration method of this invention, the activity of the regenerated activated carbon can be greatly increased in comparison with regeneration methods based on activation treatment.

As illustrated in FIG. 1, a gold recovery method using the activated carbon regenerated by the regeneration method described above includes a gold leaching step of leaching gold contained in a gold-containing metal sulfide ore, while warming, into an acidic leachate containing chloride ions and/or bromide ions as an anion and copper and iron as a cation; a gold adsorption step of adsorbing the gold leached into the acidic leachate on activated carbon; and a gold elution step of eluting the gold adsorbed on the activated carbon.

Embodiments of this recovery method are specifically as follows.

(Gold Leaching Step)

Gold-containing metal sulfide ores are pulverized, and then formed as concentrates by flotation method according to need. The gold contained in this gold-containing metal sulfide ores is leached into an acidic leachate containing chloride ions and/or bromide ions as an anion and copper and iron as a cation while being warmed. The leaching temperature can be defined as 60° C. to 100° C., and the pH of the acidic leachate can be defined as 0 to 1.9. Also, the acidic leachate preferably contains chloride ions and bromide ions in each amount of 20 g/L to 200 g/L and copper and iron in each amount of 0.01 g/L to 30 g/L.

(Gold Adsorption Step)

Next, the gold in the acidic leachate is brought in contact with the activated carbon regenerated as described above to be adsorbed thereon. Gold can be contacted with the activated carbon by batch method or continuous method of continuously passing the acidic leachate into an adsorption tower filled with activated carbon. The activated carbon used herein has an increased and enhanced activity by virtue of the regeneration method described above, and thus can efficiently adsorb gold. In this gold adsorption step, copper, iron and other metals, sulfur, etc. leached into the acidic leachate together with gold are also attached to the activated carbon.

(Gold Elution Step)

Then, the gold-adsorbed activated carbon is brought in contact with a cyanide solution formed by adding cyanide ions to caustic soda or the like, a thiosulfate-added solution or other solutions to elute the gold adsorbed on the activated carbon. Thus, the used activated carbon from which gold has been eluted sometimes becomes alkaline. A cyanide solution is preferably used from the viewpoint of the gold recovery rate.

The thus-obtained concentrated gold solution contains, for example, about 50 mg/L to 5000 mg/L of gold, and simple gold can be obtained from this concentrated gold solution by reduction method based on sodium oxalate, chemical reduction method based on sulfur dioxide, solvent extraction-electrolytic collection method, or other known methods.

The regeneration method of this invention can be applied again to the used activated carbon from which gold has been eluted in the gold elution step described above, and the activated carbon can be efficiently used in a repeated manner thereby. As a result, the cost necessary to use new activated carbon can be suppressed.

EXAMPLES

Next, the activated carbon regeneration method of this invention was carried out on trial to verify the effect thereof, which will be described below. However, the specific description given herein is intended only for illustration purposes, and the invention is not limited to this.

Test Example 1

In Examples 1 to 9, used activated carbon was washed under the respective conditions indicated in Table 1 to be regenerated.

In Example 1, the used activated carbon was activated prior to such washing treatment.

Reference Example 1 is intended for unused activated carbon, and Reference Example 2 is intended for used activated carbon. No regeneration treatment was applied to the activated carbon in these examples.

In Comparative Example 1, used activated carbon was activated, but not washed. In Comparative Example 2, used activated carbon was washed, but the pH of the washing liquid after washing became 7.6.

The following test was conducted on the activated carbons obtained in these Examples 1 to 9, Reference Examples 1 and 2, and Comparative Examples 1 and 2.

TABLE 1

|  |  | Reference Example 1 | Reference Example 2 | Comparative Example 1 | Comparative Example 2 | Example 1 | Example 2 | Example 3 |
|---|---|---|---|---|---|---|---|---|
| Kind of activated carbon |  | Unused | Used | Used | Used | Used | Used | Used |
| Regeneration treatment |  | None | None | Activation | Washing | Activation + washing | Washing | Washing |
| Washing conditions | Washing liquid |  | — |  | HCl | HCl | HCl | HCl |
|  | Washing liquid concentration (mol/L) |  |  |  | 0.1 | 1 | 0.2 | 0.5 |
|  | Hour (hr) |  |  |  | 5 | 5 | 5 | 5 |
|  | Activated carbon amount (g) |  |  |  | 50 | 50 | 50 | 50 |
|  | Liquid amount (mL) |  |  |  | 250 | 250 | 250 | 250 |
|  | Pulp concentration PD (g/L) |  |  |  | 200 | 200 | 200 | 200 |
|  | Presence or absence of stirring |  |  |  | Present | Present | Present | Present |
|  | pH of washing liquid after washing |  |  |  | 7.6 | 0.5 | 2.69 | 0.83 |

|  |  | Example 4 | Example 5 | Example 6 | Example 7 | Example 8 | Example 9 |
|---|---|---|---|---|---|---|---|
| Kind of activated carbon |  | Used | Used | Used | Used | Used | Used |
| Regeneration treatment |  | Washing | Washing | Washing | Washing | Washing | Washing |
| Washing conditions | Washing liquid | HCl | HCl | HCl | HCl | HCl | HCl |
|  | Washing liquid concentration (mol/L) | 1 | 1 | 1 | 1 | 1 | 0.5 |
|  | Hour (hr) | 5 | 5 | 5 | 1 | 3 | 5 |
|  | Activated carbon amount (g) | 50 | 25 | 100 | 50 | 50 | 50 |
|  | Liquid amount (mL) | 250 | 250 | 250 | 250 | 250 | 250 |
|  | Pulp concentration PD (g/L) | 200 | 100 | 400 | 200 | 200 | 200 |
|  | Presence or absence of stirring | Present | Present | Present | Present | Present | Absent (immersion) |
|  | pH of washing liquid after washing | 0.31 | 0.22 | 0.31 | 0.28 | 0.32 | 0.58 |

The above activated carbons were each immersed in an evaluation liquid under the conditions indicated in Table 2, and a test for measuring the concentration of gold contained in the evaluation liquid was conducted. The concentration of gold was measured by ICP emission spectrochemical analysis (ICP-OES). The leachate in Table 2 is a liquid into which specific gold ores have been leached in accordance with the gold recovery method as described above, and contains impurities such as Cu and Fe.

From the thus-obtained measurement values, the activity was calculated using the Fleming's equation (1) described previously, and the activity of each activated carbon was evaluated as a proportion when the activated carbon of Reference Example 1 is defined as 100%. The results are shown in Table 3.

TABLE 2

| Test conditions | Evaluation liquid | Leachate |
|---|---|---|
|  | pH adjusting agent | None |
|  | pH | 0.5 |
|  | Immersion time (hr) | 2 |
|  | Activated carbon amount (g) | 0.5 |
|  | Liquid amount (mL) | 500 |
|  | Pulp concentration PD (g/L) | 1 |

TABLE 3

|  |  |  | Reference Example 1 | Reference Example 2 | Comparative Example 1 | Comparative Example 2 | Example 1 | Example 2 | Example 3 |
|---|---|---|---|---|---|---|---|---|---|
| Test result | Initial Au concentration |  | 9.00 | 9.00 | 9.00 | 5.00 | 5.00 | 5.00 | 9.00 |
|  | Au concentration (C/C0) | 0 min | 1.00 | 1.00 | 1.00 | 1.00 | 1.00 | 1.00 | 1.00 |
|  |  | 15 min | 0.67 | 0.86 | 0.78 | 0.60 | 0.80 | 0.60 | 0.33 |
|  |  | 30 min | 0.67 | 0.71 | 0.78 | 0.80 | 0.80 | 0.40 | 0.33 |
|  |  | 45 min | 0.56 | 0.71 | 0.67 | 0.60 | 0.60 | 0.40 | 0.22 |
|  |  | 60 min | 0.56 | 0.71 | 0.67 | 0.60 | 0.60 | 0.40 | 0.33 |
|  |  | 120 min | 0.44 | 0.57 | 0.56 | 0.60 | 0.40 | 0.40 | 0.22 |

TABLE 3-continued

|  |  |  | | | | | | | |
|---|---|---|---|---|---|---|---|---|---|
| q/C |  | 0 g/t | 0.00 | 0.00 | 0.00 | 0.00 | 0.00 | 0.00 | 0.00 |
|  |  | 15 g/t | 1020.41 | 340.14 | 583.09 | 1360.54 | 510.20 | 1360.54 | 4081.63 |
|  |  | 30 g/t | 1041.67 | 833.33 | 595.24 | 520.83 | 520.83 | 3125.00 | 4166.67 |
|  |  | 45 g/t | 1702.13 | 851.06 | 1063.83 | 1418.44 | 1418.44 | 3191.49 | 7446.81 |
|  |  | 60 g/t | 1739.13 | 869.57 | 1086.96 | 1449.28 | 1449.28 | 3260.87 | 4347.83 |
|  |  | 120 g/t | 2777.78 | 1666.67 | 1777.78 | 1481.48 | 3333.33 | 3333.33 | 7777.78 |
| Fleming's | k value |  | 1825.50 | 1022.50 | 1132.00 | 1242.50 | 1557.00 | 3101.30 | 5874.30 |
| equation | n value |  | 0.51 | 0.69 | 0.57 | 0.19 | 0.96 | 0.40 | 0.29 |
|  | $R^2$ |  | 0.89 | 0.90 | 0.89 | 0.11 | 0.89 | 0.63 | 0.48 |
|  | Activity |  | 100% | 56.0% | 62.0% | 68.1% | 85.3% | 169.9% | 321.8% |

|  |  |  | Example 4 | Example 5 | Example 6 | Example 7 | Example 8 | Example 9 |
|---|---|---|---|---|---|---|---|---|
| Test result | Initial Au concentration |  | 7.00 | 6.00 | 6.99 | 7.00 | 11.00 | 11.00 |
|  | Au | 0 min | 1.00 | 1.00 | 1.00 | 1.00 | 1.00 | 1.00 |
|  | concentration | 15 min | 0.71 | 0.50 | 0.50 | 0.57 | 0.45 | 0.27 |
|  | (C/C0) | 30 min | 0.57 | 0.50 | 0.50 | 0.57 | 0.45 | 0.36 |
|  |  | 45 min | 0.57 | 0.33 | 0.50 | 0.57 | 0.36 | 0.27 |
|  |  | 60 min | 0.57 | 0.33 | 0.50 | 0.57 | 0.36 | 0.27 |
|  |  | 120 min | 0.43 | 0.33 | 0.33 | 0.43 | 0.27 | 0.27 |
| q/C |  | 0 g/t | 0.00 | 0.00 | 0.00 | 0.00 | 0.00 | 0.00 |
|  |  | 15 g/t | 816.33 | 2040.82 | 2040.82 | 1530.61 | 2448.98 | 5442.18 |
|  |  | 30 g/t | 1562.50 | 2083.33 | 2083.33 | 1562.50 | 2500.00 | 3645.83 |
|  |  | 45 g/t | 1595.74 | 4255.32 | 2127.66 | 1595.74 | 3723.40 | 5673.76 |
|  |  | 60 g/t | 1630.43 | 4347.83 | 2173.91 | 1630.43 | 3804.35 | 5797.10 |
|  |  | 120 g/t | 2962.96 | 4444.44 | 4444.44 | 2962.96 | 5925.93 | 5925.93 |
| Fleming's | k value |  | 1907.60 | 3750.10 | 2739.20 | 1973.00 | 4043.50 | 5404.50 |
| equation | n value |  | 0.56 | 0.45 | 0.34 | 0.29 | 0.44 | 0.11 |
|  | $R^2$ |  | 0.92 | 0.73 | 0.62 | 0.63 | 0.90 | 0.61 |
|  | Activity |  | 104.5% | 205.4 | 150.1% | 108.1% | 221.5% | 296.1% |

The results indicated in Table 3 have revealed that the activated carbon of Comparative Example 1 subjected only to activation treatment has activity of 62%, whereas all the activated carbons of Examples 1 to 9 subjected to washing treatment have activity greatly exceeding 80%. Also, the activated carbon of Comparative Example 2, wherein the activated carbon was subjected to washing treatment, but the pH of the washing liquid after washing became 7.6, exhibited comparatively low activity of 68.1%.

Test Example 2

In order to explore the reason why the activity of used activated carbon cannot fully be increased when the used activated carbon is washed with an acidic washing liquid so that the acidic washing liquid after the washing becomes in an approximately neutral region, there was measured the transition of the pH of hydrochloric acid solutions having different concentrations as the acidic washing liquids and industrial water, with elapse of time when the used activated carbon was washed with the respective hydrochloric acid solutions and industrial water. FIG. 2 shows the results. The activated carbon after elution of gold using an alkali cyanide solution was used as the used activated carbon.

It can be seen that, when the used activated carbon was introduced into the respective hydrochloric acid solutions, all of the hydrochloric acid solutions exhibit an increased pH due to the alkaline substance (caustic soda) attached to the activated carbon, as shown in FIG. 2, with elapse of the washing time.

Especially, the hydrochloric acid solution having a low concentration of 0.1 mol/L shows a pH of higher than 7 at the stage where one-hour washing time has elapsed.

From this result, it can be inferred that, copper, iron and the like attached to the surface of the activated carbon were dissolved even in hydrochloric acid solutions having a low concentration because of a low pH of the solutions immediately after introduction of the activated carbon, but that the once-dissolved copper, iron and the like were then deposited in the hydrochloric acid solution having a concentration of 0.1 mol/L and covered the surface of the activated carbon again, due to the increase in pH up to around the neutral region.

Thus, it is considered important in effective increase in activity of activated carbon to keep the acidic washing liquid in the acidic region at the time of completion of washing.

Test Example 3

In Examples 10 to 13, the used activated carbon was washed under the respective conditions indicated in Table 4 to be regenerated. Reference Example 3 is intended for unused activated carbon, and Reference Example 4 is intended for used activated carbon. No regeneration treatment was applied to the activated carbon in these examples.

In Comparative Example 3, used activated carbon was activated, but not washed. In Comparative Example 4, used activated carbon was washed, but the pH of the washing liquid after washing became 7.6.

The following test was conducted on the activated carbons obtained in these Examples 10 to 13, Reference Examples 3 and 4, and Comparative Examples 3 and 4.

TABLE 4

|  |  | Reference Example 3 | Reference Example 4 | Comparative Example 3 | Comparative Example 4 | Example 10 | Example 11 | Example 12 | Example 13 |
|---|---|---|---|---|---|---|---|---|---|
| Kind of activated carbon |  | Unused | Used | Used | Used | Used | Used | Used | Used |
| Regeneration treatment |  | None | None | Activation | Washing | Washing | Washing | Washing | Washing |
| Washing conditions | Washing liquid |  |  | — | HCl | Industrial water | Industrial water | NaOH | NaOH |
|  | Washing liquid concentration (mol/L) |  |  |  | 0.1 | 0 | 0 | 0.1 | 0.5 |
|  | Hour (hr) |  |  |  | 5 | 5 | 5 | 5 | 5 |
|  | Activated carbon amount (g) |  |  |  | 50 | 50 | 50 | 50 | 50 |
|  | Liquid amount (mL) |  |  |  | 250 | 250 | 250 | 250 | 250 |
|  | Pulp concentration PD (g/L) |  |  |  | 200 | 200 | 200 | 200 | 200 |
|  | Presence or absence of stirring |  |  |  | Present | Present | Absent (immersion) | Present | Present |
|  | pH of washing liquid after washing |  |  |  | 7.6 | 9.7 | 8.81 | 12 | 13.5 |

The above activated carbons were each immersed in an evaluation liquid under the conditions indicated in Table 5, and a test for measuring the concentration of gold contained in the evaluation liquid was conducted. The concentration of gold was measured by ICP emission spectrochemical analysis (ICP-OES). The leachate in Table 5 is a liquid into which specific gold ores have been leached in accordance with the gold recovery method as described above, and contains impurities such as Cu and Fe.

From the thus-obtained measurement values, the activity was calculated using the Fleming's equation (1) described previously, and the activity of each activated carbon was evaluated as a proportion when the activated carbon of Reference Example 3 is defined as 100%. The results are shown in Table 6.

TABLE 5

| Test conditions | Evaluation liquid | Leachate |
|---|---|---|
|  | pH adjusting agent | None |
|  | pH | 0.5 |
|  | Immersion time (hr) | 2 |
|  | Activated carbon amount (g) | 0.5 |
|  | Liquid amount (mL) | 500 |
|  | Pulp concentration PD (g/L) | 1 |

The results indicated in Table 6 have revealed that the activated carbon of Comparative Example 3 subjected only to activation treatment has activity of 62%, whereas all the activated carbons of Examples 10 to 13 subjected to washing treatment have activity greatly exceeding 80%. Also, the activated carbon of Comparative Example 4, wherein the activated carbon was subjected to washing treatment by an acidic washing liquid, and the pH of the washing liquid after washing became 7.6, exhibited comparatively low activity of 68.1%.

Among Examples 10 to 13, in Example 13 which showed a higher caustic soda molar concentration of 0.5 mol/L than that in Example 12, the activity was not so greatly improved in comparison with Example 12.

Test Example 4

Used activated carbon was washed with water to measure the element grade of the activated carbon surfaces before and after washing by EPMA (Electron Probe MicroAnalyser). Table 7 indicates the results.

TABLE 6

|  |  |  | Reference Example 3 | Reference Example 4 | Comparative Example 3 | Comparative Example 4 | Example 10 | Example 11 | Example 12 | Example 13 |
|---|---|---|---|---|---|---|---|---|---|---|
| Test result | Initial Au concentration |  | 9.00 | 9.00 | 9.00 | 5.00 | 5.00 | 9.00 | 4.00 | 2.00 |
| Test result | Au concentration (C/C0) | 0 min | 1.00 | 1.00 | 1.00 | 1.00 | 1.00 | 1.00 | 1.00 | 1.00 |
|  |  | 15 min | 0.67 | 0.86 | 0.78 | 0.60 | 0.40 | 0.33 | 0.50 | 1.00 |
|  |  | 30 min | 0.67 | 0.71 | 0.78 | 0.80 | 0.40 | 0.33 | 0.50 | 0.50 |
|  |  | 45 min | 0.56 | 0.71 | 0.67 | 0.60 | 0.40 | 0.33 | 0.50 | 0.50 |
|  |  | 60 min | 0.56 | 0.71 | 0.67 | 0.60 | 0.40 | 0.33 | 0.50 | 0.50 |
|  |  | 120 min | 0.44 | 0.57 | 0.56 | 0.60 | 0.40 | 0.33 | 0.25 | 0.45 |
|  | q/C | 0 g/t | 0.00 | 0.00 | 0.00 | 0.00 | 0.00 | 0.00 | 0.00 | 0.00 |
|  |  | 15 g/t | 1020.41 | 340.14 | 583.09 | 1360.54 | 3061.22 | 4081.63 | 2040.82 | 0.00 |
|  |  | 30 g/t | 1041.67 | 833.33 | 595.24 | 520.83 | 3125.00 | 4166.67 | 2083.33 | 2083.33 |
|  |  | 45 g/t | 1702.13 | 851.06 | 1063.83 | 1418.44 | 3191.49 | 4255.32 | 2127.66 | 2127.66 |
|  |  | 60 g/t | 1739.13 | 869.57 | 1086.96 | 1449.28 | 3260.87 | 4347.83 | 2173.91 | 2173.91 |
|  |  | 120 g/t | 2777.78 | 1666.67 | 1777.78 | 1481.48 | 3333.33 | 4444.44 | 6666.67 | 2716.05 |
| Fleming's equation | k value |  | 1825.50 | 1022.50 | 1132.00 | 124250.0 | 3239.20 | 4318.90 | 3148.00 | 2294.00 |
|  | n value |  | 0.51 | 0.69 | 0.57 | 0.19 | 0.04 | 0.04 | 0.51 | 0.20 |
|  | R^2 |  | 0.89 | 0.90 | 0.89 | 0.11 | 0.98 | 0.98 | 0.59 | 0.8705 |
|  | Activity |  | 100% | 56.0% | 62.0% | 68.1% | 177.4% | 236.6% | 172.4% | 125.7% |

TABLE 7

| Element | Before washing Element weight % | After washing Element weight % |
|---|---|---|
| C | 58.78 | 64.03 |
| O | 25.03 | 21.06 |
| Na | 5.16 | 2.46 |
| Mg | 1.02 | 1.06 |
| Al | 0.72 | 0.63 |
| Si | 0.74 | 0.35 |
| S | 0.40 | 0.55 |
| Cl | 0.27 | — |
| Ca | 1.09 | 2.85 |
| Ti | — | 0.32 |
| Cr | — | 0.15 |
| Fe | 5.62 | 5.57 |
| Ni | 0.19 | 0.36 |
| Ag | 0.97 | 0.60 |

From the results indicated in Table 7, it can be seen that the Na element is greatly decreased on the activated carbon surface after washing in comparison with that before washing.

Thus, it is considered that sodium which covered the surface of the used activated carbon has been removed by washing, resulting in greatly increased activity of the activated carbon after washing.

Test Example 5

Measured was the transition of the pH of the respective washing liquids when the used activated carbon was washed with an alkaline washing liquid, a neutral washing liquid, and an acidic washing liquid. FIG. 3 shows the results. Aqueous caustic soda solutions with concentrations of 0.1 mol/L and 0.5 mol/L, respectively, were used as the alkaline washing solution, and industrial water was used as the neutral washing liquid. A hydrochloric acid solution with a concentration of 0.1 mol/L was used as the acidic washing liquid. Also, the activated carbon after elution of gold using an alkaline cyanide solution was used as the used activated carbon.

It can be seen that, upon introduction of the used activated carbon into the respective solutions, all the solutions exhibit an increased pH due to the alkaline substance (caustic soda) attached to the activated carbon, as shown in FIG. 2.

All the aqueous caustic soda solutions and industrial water are maintained in the alkaline region or neutral region over before and after washing, whereas the hydrochloric acid solution exhibits a pH exceeding 7 and changes from the acidic region to approximately the neutral region at the state where one-hour washing time has elapsed.

From this result, it can be inferred that the once-dissolved copper, iron and the like were then deposited in the hydrochloric acid solution and covered the surface of the activated carbon again, due to the increase in pH up to around the neutral region. Therefore, it is considered that the activity of the used activated carbon cannot be increased when the pH of the hydrochloric acid solution exceeds 7 after washing with such a hydrochloric acid solution.

It has been understood, from the respective test results presented above, that the activated carbon regeneration method of this invention can be used to greatly increase the activity of the activated carbon to be regenerated and to efficiently recycle this activated carbon.

The invention claimed is:

1. A method for regenerating used activated carbon from which gold has been eluted, the method comprising:
    after eluting the gold from the activated carbon thus providing the used activated carbon;
    washing the used activated carbon with an acidic washing liquid or alkaline washing liquid; and
    when the used activated carbon is washed with the acidic washing liquid, keeping a pH of the acidic washing liquid after the washing at 2.7 or lower, or when the used activated carbon is washed with an alkaline washing liquid, keeping a pH of the alkaline washing liquid after the washing at 8 or more, wherein an aqueous caustic soda solution is used as the alkaline washing liquid and a molar concentration of the aqueous caustic soda solution is 0.1 mol/L to 2.0 mol/L.

2. The method of claim 1, wherein the used activated carbon is washed with the acidic washing liquid, and a hydrochloric acid solution is used as the acidic washing liquid.

3. The method of claim 1, wherein the used activated carbon is washed with the alkaline washing liquid, and pH of the alkaline washing liquid after the washing is 8 to 12.

4. The method of any one of claims 1, 2, and 3, wherein, when the used activated carbon is washed with the acidic washing liquid or alkaline washing liquid, a column is filled with the used activated carbon, and the acidic washing liquid or alkaline washing liquid is allowed to flow into the column.

5. The method of any one of claims 1, 2, and 3, wherein providing the used activated carbon comprises providing the used activated carbon after eluting the gold from the activated carbon by using a cyanide solution.

6. The method of any one of claims 1, 2, and 3, wherein providing the used activated carbon comprises providing the used activated carbon after eluting the gold from the activated carbon, the activated carbon having been used for adsorption of the gold in a gold-containing liquid,
    wherein the gold-containing liquid is a liquid obtained by leaching the gold contained in a gold-containing metal sulfide ore, while warming, into an acidic leachate containing chloride ions and/or bromide ions as an anion and copper and iron as a cation.

7. A gold recovery method, comprising:
    a gold leaching step of leaching the gold in a gold-containing metal sulfide ore, while warming, into an acidic leachate containing chloride ions and/or bromide ions as an anion and copper and iron as a cation;
    a gold adsorption step of adsorbing the gold leached into the acidic leachate on activated carbon; and
    a gold elution step of eluting the gold adsorbed on the activated carbon,
    wherein the activated carbon regenerated by the method of any one of claims 1, 2, and 3 is used as the activated carbon.

* * * * *